INVENTOR.
ROBERT H. BRIDGES
BY

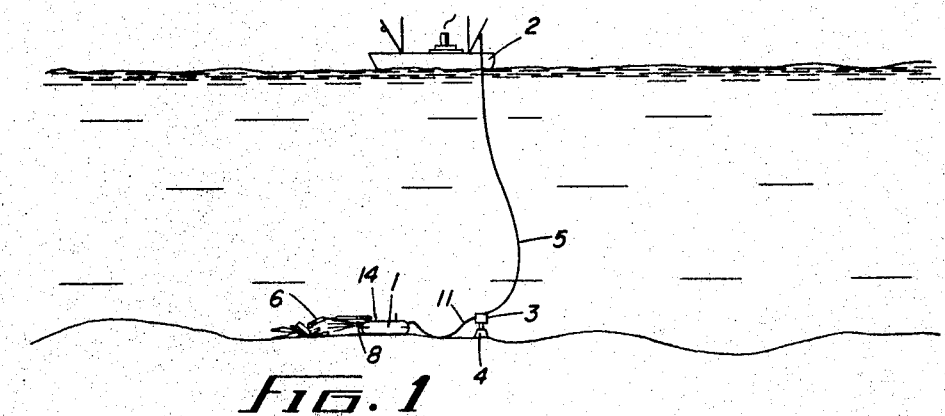
FIG. 1
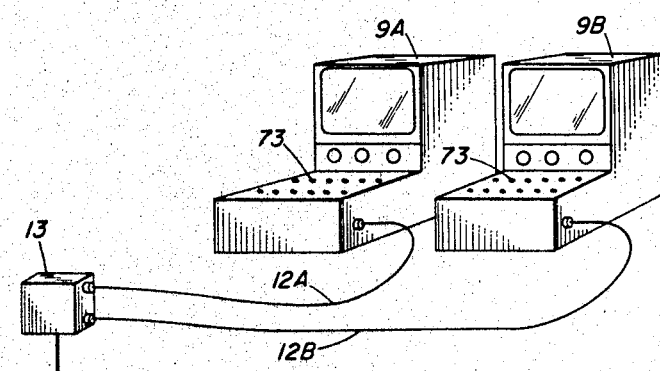
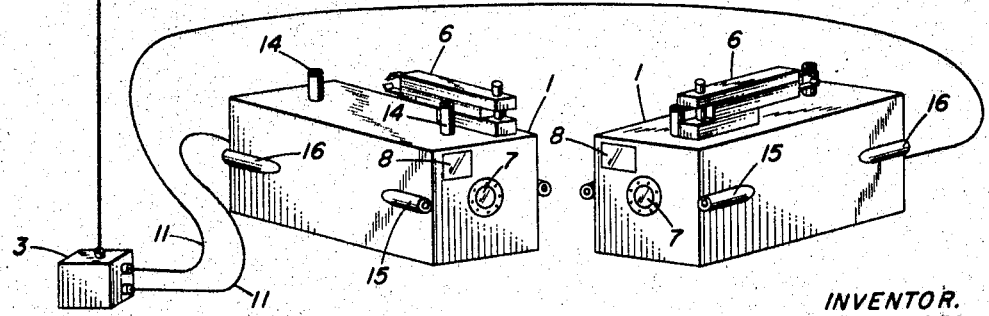
FIG. 2
INVENTOR.
ROBERT H. BRIDGES
ATTORNEY

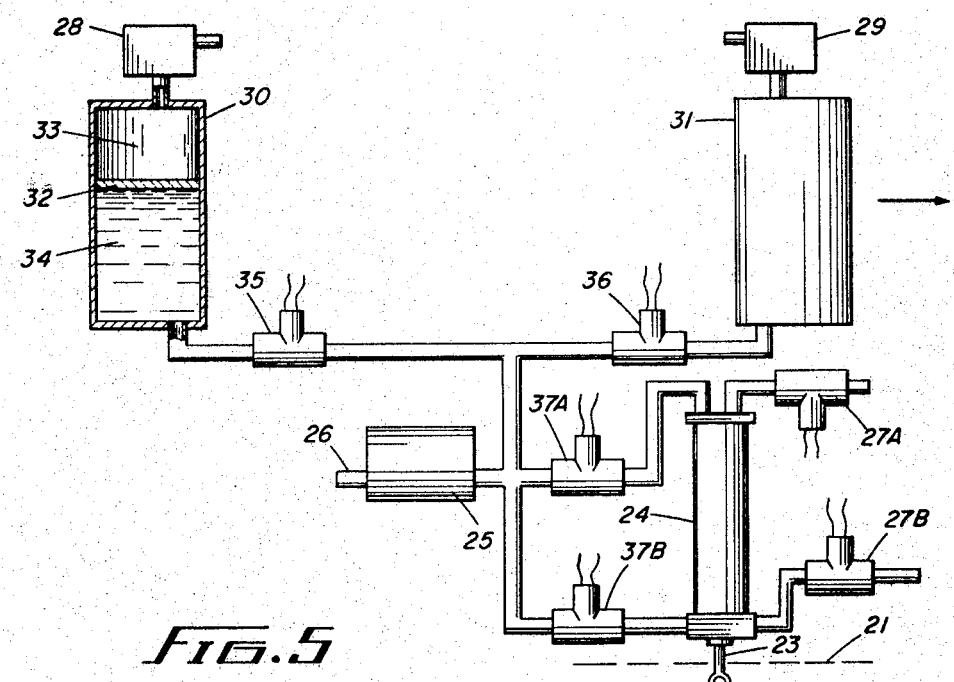
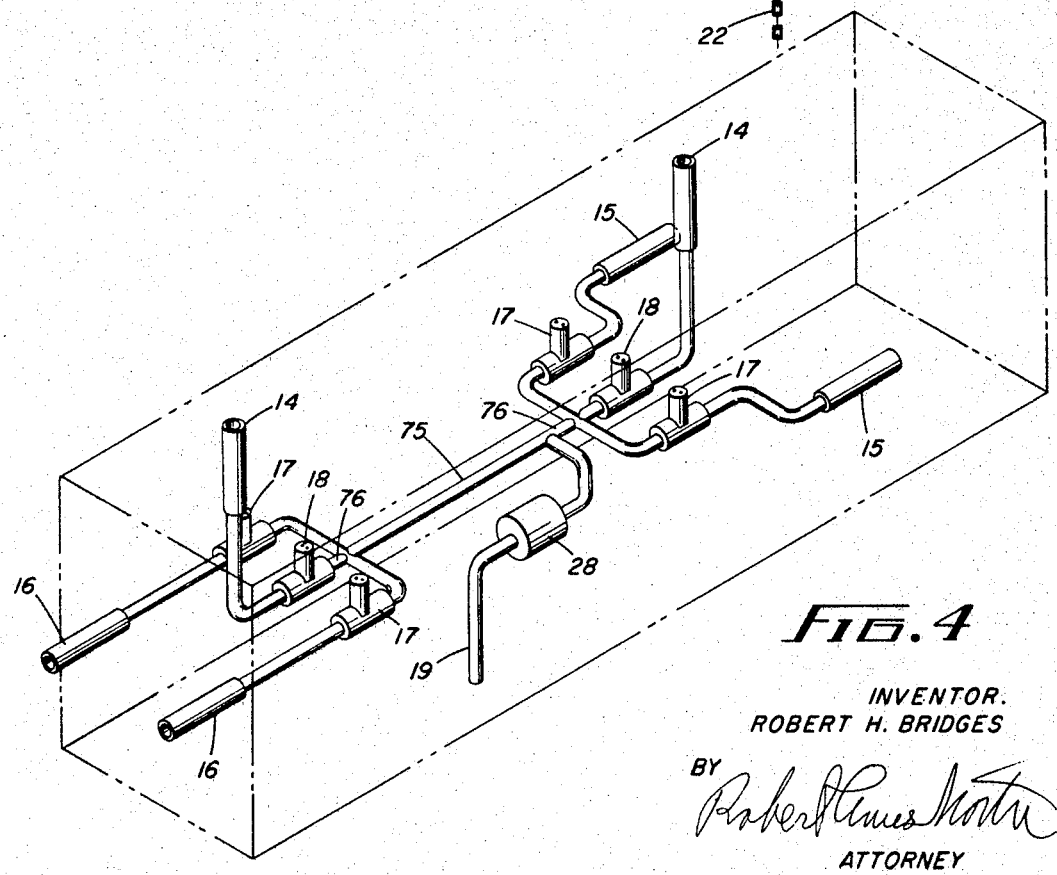
FIG. 5
FIG. 4
INVENTOR.
ROBERT H. BRIDGES
BY
*Robert Ames Norton*
ATTORNEY

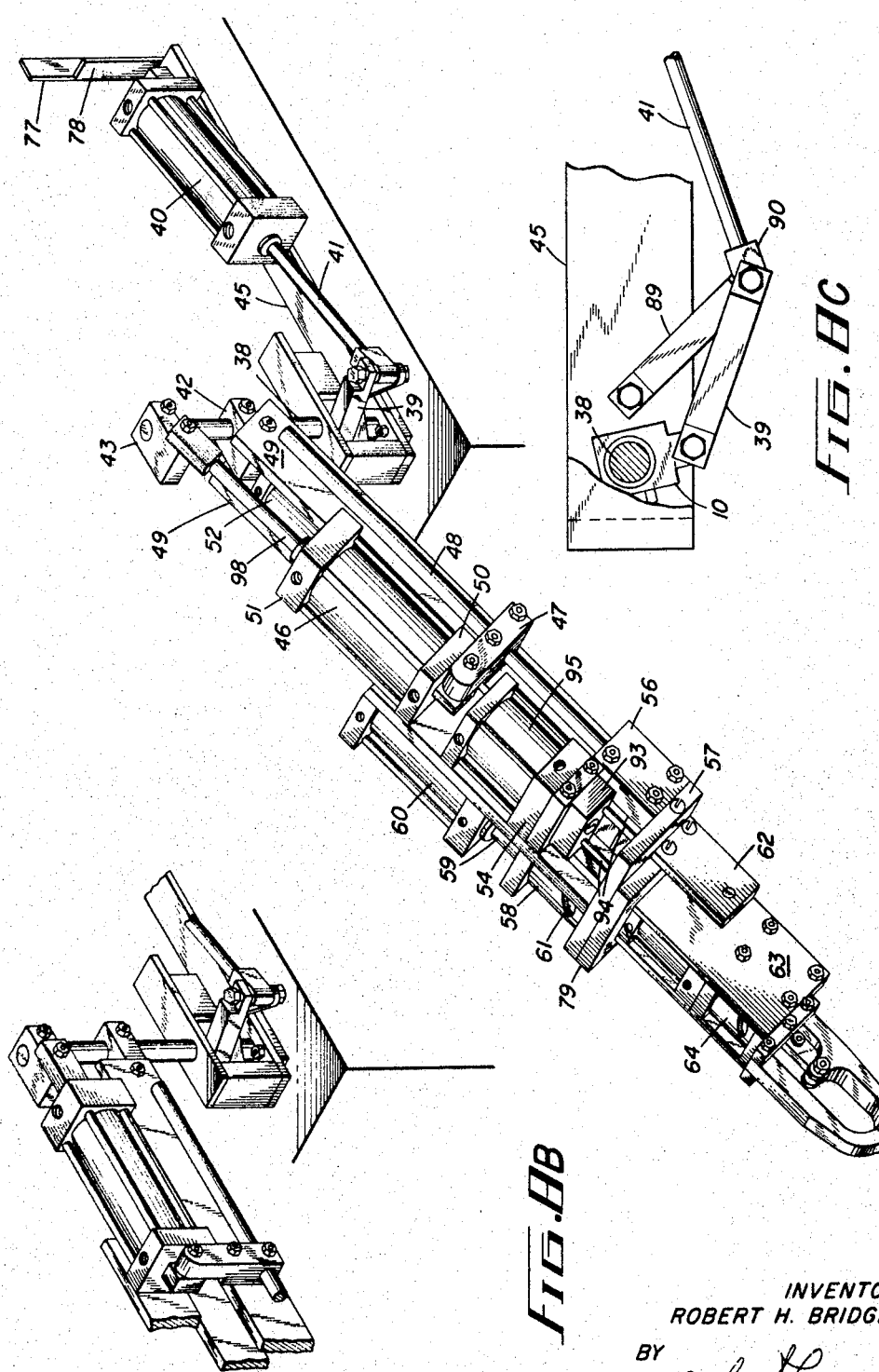

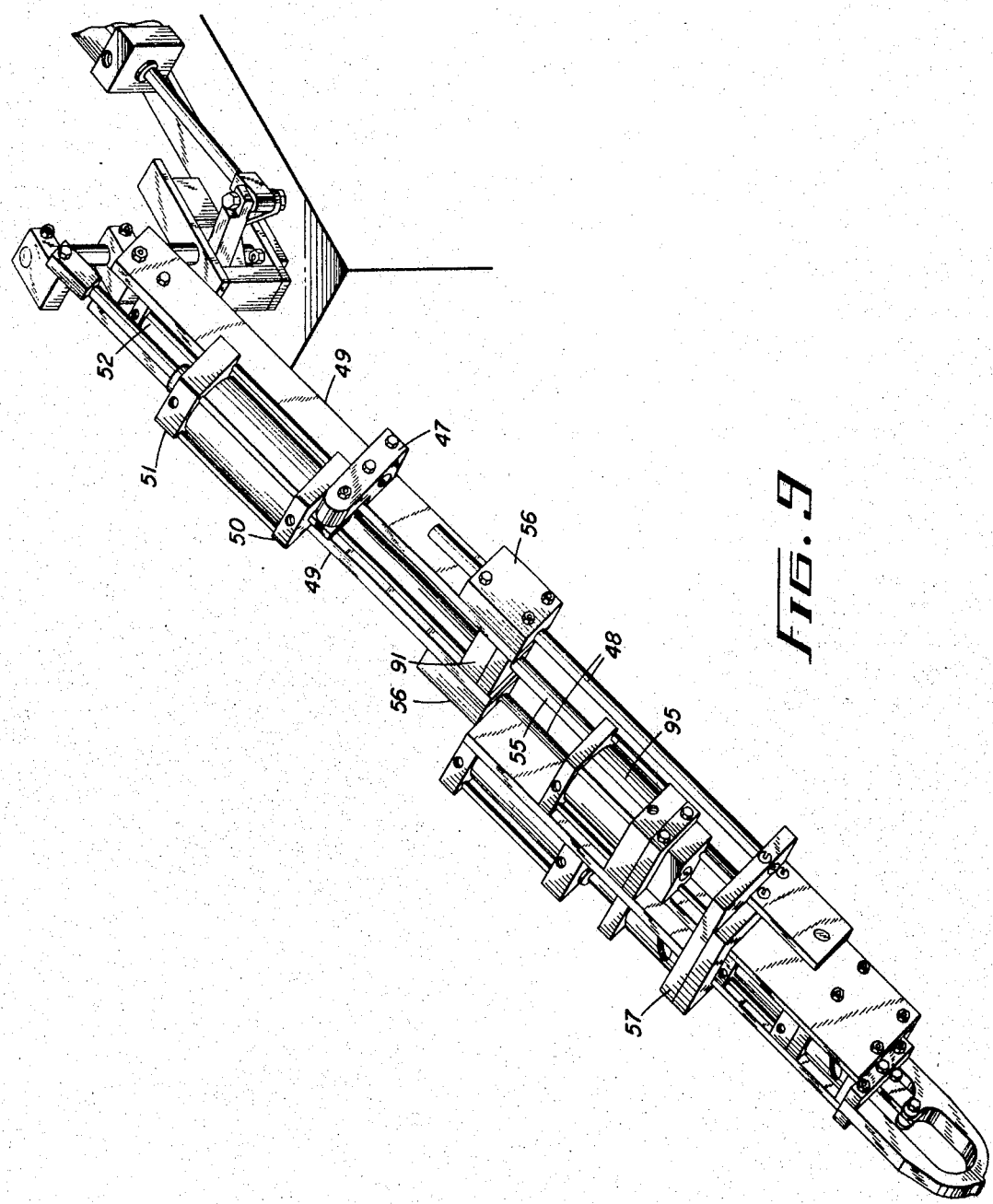

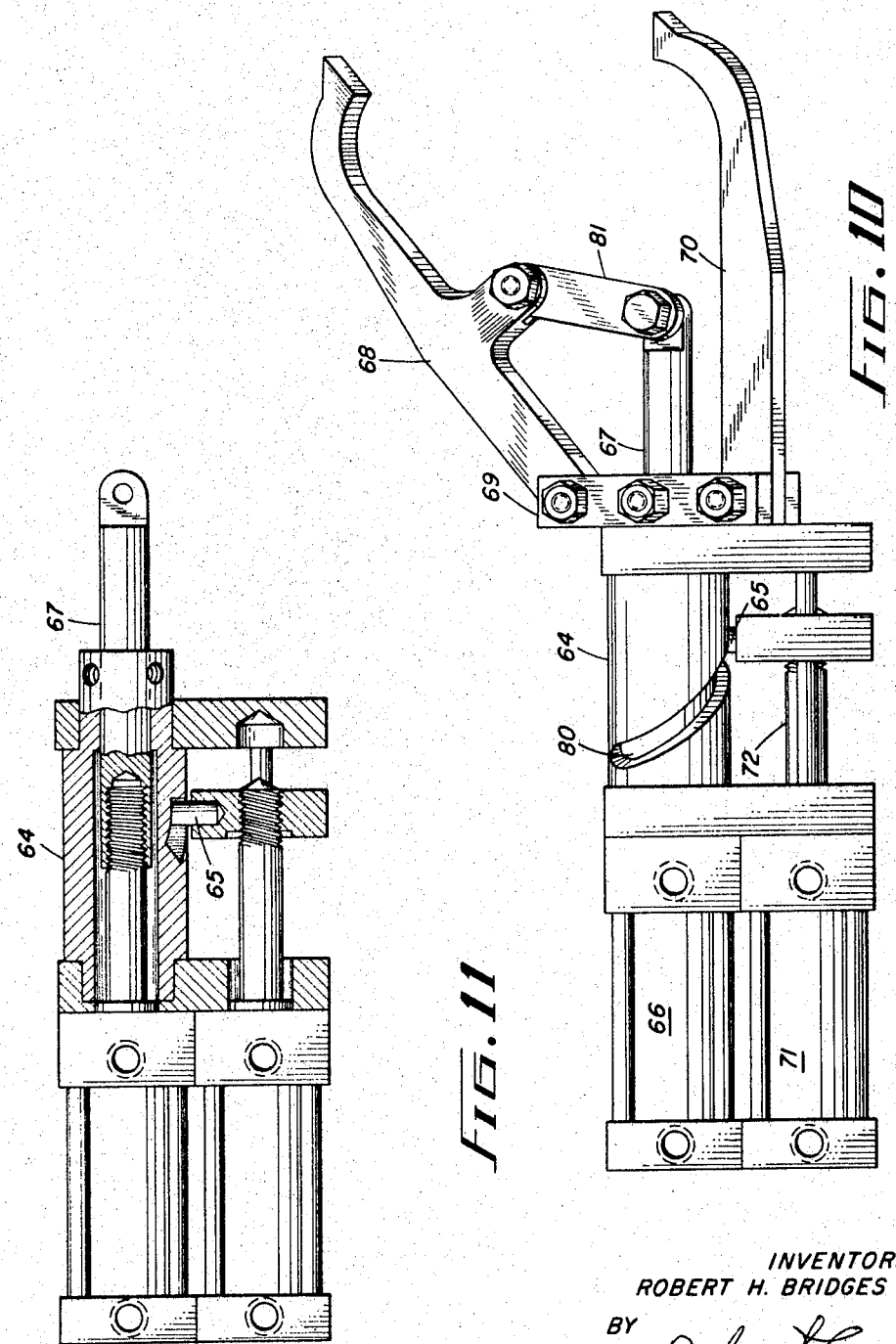

ATTORNEY

United States Patent Office 3,454,169
Patented July 8, 1969

3,454,169
REMOTE CONTROL SUBMERSIBLE AND/OR REMOTE MANIPULATOR ARM
Robert H. Bridges, 54 Little John Lane,
Springdale, Conn. 06879
Filed July 20, 1967, Ser. No. 654,914
Int. Cl. B25j 13/00; B66c 3/00
U.S. Cl. 214—1                                  8 Claims

ABSTRACT OF THE DISCLOSURE

A small remote controlled submersible with television, lighting and preferably one or more manipulator arms is driven from a mother ship, manned submersible or surface platform by means of water jets, one pair aft and one pair forward. When maneuvering vertical elevation is provided by maintaining the submersible with a small amount of positive buoyancy. Additional jets are then provided on the top of the submersible only, and it is maintained at the desired depth by the flow of water from these jets. As a result, there is no flow of water down toward the bottom and no silt or mud is stirred up. The manipulator arm which can be used apart from a submersible duplicates the basic actions of a human arm and hand but has no elbow joint, merely means of extending the arm portion more or less.

The manipulator arm makes use of barrel cams and linkage mechanisms in such a way that complex combinations of motions are produced in confined areas, but yet with simplicity and without the weakness and complexity of an elbow joint.

The manipulator arm is actuated by two-way fluid cylinders, and preferably one end of each cylinder is exposed to the ambient water and the cylinder controlled only by pumping in or out fluid at the unexposed end, the pressure of the ambient water providing the power for the reverse movement. Hydraulic lines and control valving is thus considerably simplified.

Background of the invention

Remote controlled submersibles, including those with television cameras and remote controlled arms, are known. However, as the submersible in ordinary use has to move quite near the ocean bottom, the ordinary means of maintaining its level by jets or propellers which direct water down as well as up causes a flow of water to strike the bottom, which is often covered with silt or mud. This stirs up the silt, and in the turbid water thus resulting satisfactory television pictures are unobtainable. This has greatly reduced the utility of such controlled submersibles.

It is also common to operate devices with remote controlled arms which simulate the movements of a human arm and hand. The arms have some or all of the same basic kinds of joints that the human arm does, namely a shoulder joint which can move in two directions, an elbow joint, a wrist joint which can twist and bend, grasping devices for the fingers, and often means for twisting the grasping devices themselves. Specialized grasping devices are often necessary as it is impractical to design finger elements which fully duplicate the movements of the fingers of the human hand.

In manipulators used hitherto considerable complexity was involved if all the primary movements of the human arm were to be duplicated.

The known remote controlled arms have been very effective when used in air, for example for the remote control handling of radioactive material and the like. However, the underwater environment is substantially more hostile due to the corrosive nature of sea water, the high ambient pressure and the potentially disastrous effect of water on electrical circuits.

Simple hydraulic cylinder actuators have distinct advantages in an application for underwater manipulators. Electrical wiring is minimized and substantial forces can be developed in relatively confined spaces. While it has been possible to control many motions such as shoulder elevate and depress using hydraulic cylinders and well-known mechanical linkages, to date practical manipulators have not been developed which permit in a confined space rotational movement around two axes at 90° to each other with the minimum amount of mechanical complexity.

Another but sometimes less serious problem is presented when it is necessary to store the manipulator during maneuvering and recovering the submersible. A manipulator arm of the ordinary type with an elbow joint if folded, projects considerably outside the submersible, because of course the folding at the elbow joint results in two layers of arm elements, and this has sometimes created a problem, although much less serious than those which have been described above. This problem can be solved by storage within a submersible but this requires an additional actuator and increased mechanical complexity.

Summary of the invention

The present invention involves two general fields, the submersible and its control and the manipulator arm, regardless of what the arm is mounted on. Of course the two are combined because the submersible preferably also has the arm mounted thereon. However, a submersible may be used without an arm where it is merely intended to view and the arm may be used with other structures.

The submersible, or submersibles, because it is perfectly practical to control more than one small submersible from a single mother ship or other manned control point, are lowered and are connected to the ship through power and signal cables. While the cable is not a new thing by itself, it is preferred to have a cable which transmits high frequency signals from the television camera on the submersible and also carries electric power and preferably control signals, which may be in the nature of coded pulses, different frequencies, and the like. Preferably there is provided an underwater junction box which is lowered and anchored to the bottom near where the submersibles are going to operate. This permits the cables from the junction box to the submersibles to extend essentially horizontally, and isolate the submersibles from the effects of ship movement and underwater current on the main cable, and minimizes fouling problems. The combination of an underwater junction box with the submersibles is not the main feature of the present invention, and of course can be omitted. However, in a more specific aspect it represents an advantageous operating modification.

As is set out in a few descriptions of known remote control submersibles, propulsion is by water jets, which can be actuated by electric motor driven pumps controlled with solenoid valves and the like. The submersibles of the present invention use water jets, but they have a special arrangement. The submersible is provided with buoyancy adjusting means and can be trimmed to a small positive buoyancy during maneuvering. As a result, while the forward and aft and horizontal turning jets are substantially the same as in some manned submersibles, the control of the level at which the vessel operates is by means only of jets on the top of the submersible, for example one forward and one aft, so that there is never any jet of water directed vertically downward. This solves a very serious problem, because the ocean floor or other sea beds are often covered with extremely fine silt or mud and a jet moving downwardly with any significant velocity stirs up the mud and renders the water so turbid that television observation often is impossible or at best very unclear. With the vertical jets there is never any stirring up of bottom sediment, the water remains clear, and television images of high quality are produced. This combination of controllable positive buoyancy with vertical control jets pointing only upward, instead of upward and downward jets which were used in the past, is one of the principal features of the present invention as far as control of the submersible is concerned.

Sometimes it is desirable to move the submersible at a fixed distance above the ocean floor. Normally the movement is slow, but even so, if there is a sudden change in contour of the floor this may not be sensed sufficiently quickly by the observers of the television images and so the submersible may scrape the bottom. This is, of course, undesirable for many reasons, not the least of which is that it will stir up sediment and render the water turbid. Accordingly, in a more speific aspect of the invention as it relates to the controlled submersibles is a device which instantly senses changes in the profile of the floor of the ocean. This may, for example, be effected by a chain or other weight which is extended a little further than the desired depth and which moves slowly along the bottom. This chain is, of course, away from the forward portion of the submersible so that there will be no mud stirred up in front of the television camera. As the submersible slowly moves along, if there is an obstruction or a sudden change in profile, more links of the chain become supported by the sea bottom, thus reducing the weight of the submersible and giving it an increased positive buoyancy. This is in addition to the small positive buoyancy which is controlled by other means and which permits the general vertical adjustment by the water jets on the top of the submersible.

As far as the submersible itself is concerned, it is an advantage of the present invention that any desired shape may be used. The submersible can be a rectangular box, for example 4 feet, 6 feet or so in length, with a television camera in its bow and of course a suitable high intensity light. Of course the submersible may also be streamlined if this is desired. In general, the exact shape of the submersible is not an essential feature of the present invention.

The propulsion jets are preferably in pairs fore and aft and preferably are close to or actually a portion of the side of the submersible so that a minimum of projection results, which minimizes fouling. Further minimizing of the fouling in a more preferred modification involves an underwater junction box from which power and signal cables extend substantially horizontally to the submersible or submersibles. Obviously, of course, the power cable enters the stern of the submersible and so is out of the way of a manipulator arm if that is provided on top of the submersible to reach over the bow and grasp objects viewed by the television camera or to perform such other functions as are needed. Optionally, the manipulator arm can be mounted on the side of the submersible and more than one arm can be provided.

While, for the most part, pumps, jets, control valves and the like are of more or less conventional design, which is a practical advantage, there is also included in a more particular aspect very efficient trimming containers fore and aft. In a broader aspect, of course, the invention is not limited to any particular trimming means and so any suitable means may be used.

In manipulators used hitherto considerable complexity was involved if all the primary movements of the human arm were to be duplicated.

The known remote controlled arms have been very effective when used in air, for example for the remote control handling of radioactive material and the like. However, the underwater environment is substantially more hostile due to the corrosive nature of sea water, the high ambient pressure and the potentially diastrous effect of water on electrical circuits.

Simple hydraulic cylinder actuators have distinct advantages in an application for underwater manipulators. Electrical wiring is minimized and substantial forces can be developed in relatively confined spaces. While it has been possible to control many motions such as shoulder elevate and depress using hydraulic cylinders and well-known mechanical linkages, to date practical manipulators have not been developed which permit in a confined space rotational movement around two axes at 90° to each other with the minimum amount of mechanical complexity. When the manipulator arm is not in use, for example when the submersible is stored, towed, or otherwise moved, the shoulder joint turns the arm toward the rear of the submersible, it is retracted to its maximum extent, and lies perfectly flat. This keeps its projection outside of the submersible a minimum, whereas an arm with an elbow extends at least twice as much. It is also possible to have a supporting element against which the retracted manipulator arm is firmly held by one of the shoulder joint actuating mechanisms so that the retracted manipulator arm in towing position is firmly held.

As far as the manipulator arm itself is concerned, as pointed out above, it eliminates one of the elements of manipulator arms in the past, namely an elbow joint. The shoulder joint can be essentially similar to shoulder joints used in other manipulators. It is usually desirable to have a shoulder joint which has turning mechanisms about two orthogonal axes; the ball and socket joint of the human shoulder, while well adapted to operation with human muscles, is not well adapted for mechanical operation. The arm itself has no elbow joint but can be extended or retracted over a considerable distance. In all positions, of course, it is rigidly braced by guide rails, guide rods, and the like, and therefore does not have the bending weakness which is so serious a problem when a manipulator arm with an elbow joint is used in a hostile environment. The wrist joint is provided with mechanisms which can both twist the hand element and bend it or hinge it. This joint is not unknown anymore than a shoulder joint is, but the present invention includes a more effective means for creating twisting. This is an barrel cam with a groove or slot coacting with a pin. Preferably the barrel cam is hollow and a shaft passes therethrough which effects hand pivoting about an axis at 90° to the rotational axis. This is an extremely rugged and simple mechanism and is, of course, actuated by straight push and pull from a rod from a double-acting cylinder. The fingers on the hand are not essentially different from those of other manipulators, and in fact any design of fingers can be used which is best suited for the particular purposes for which the arm is used. Since most fingers are rigid and can only be moved toward and away from each other in a grasping motion, it is necessary in the present invention, and is also needed in other manipulator arms if they are to perform all of the functions of the human arm and hand, to provide some means for twisting the fingers with respect to the hand itself. Preferably in the present invention this is effected with another hollow barrel cam which is concentric with the shaft which produces the opening and closing motion and thus the wrist and finger movements are effected with rugged, reliable mechanisms which assure a long life and can be used with considerable force, so that fairly heavy objects can be grasped and carried. For the preferred and most complete manipulator arm, both the elimination of the elbow joint and the use of barrel cams for wrist and finger twisting should be combined together.

It is an advantage of this feature of the invention that the barrel cam wrist and finger and/or finger rotational means can be used also with a manipulator arm which has an elbow joint. Of course in such a case the elbow joint is not eliminated nor its corresponding weaknesses. This additional versatility of the barrel cam motion adds a desirable versatility to this feature of the invention. Another possibility to which the barrel cam mechanism readily lends itself, is to use one such element at the end of an upper arm of a manipulator, to cause rotation about two orthogonal axes at right angles to the upper arm which produces the equivalent of an elbow. The hollow barrel cam elements lend themselves to very compact structure and functions which simulate two kinds of motion as described can be combined in a very simple mechanism with two actuators. This type of motion will be described in more detail in conjunction with specific descriptions of twisting a wrist and flexing it.

Transmission of power, television signals, control signals and the like can be effected with known types of electronic circuits. Only one will be illustrated below and it is typical only. This is an advantage as it is not necessary to design new electronic circuits for the present invention and standard circuits can be combined together to effect the desired functions, which simplifies construction of the vessel and reduces its cost.

The various joints, or more accurately movements, in the manipulator arm are effected preferably by double-acting hydraulic cylinders. It is, of course, possible to actuate these various elements by other means, such as electrical motors, but this creates complexities and problems in the hostile environment of underwater use, particularly in the corrosive environment of sea water. Therefore, hydraulic cylinders are greatly preferred.

It is perfectly possible to have hydraulic cylinders with working fluid introduced in both ends from pumps in the submersible, and in this case the fluid of course can be any suitable fluid. However, great simplification, economies, and increase in reliability is effected if water is used as the fluid for actuating the cylinders and is pumped into or out only one end of each cylinder, the other end being open to the ambient water. As a result, hydraulic lines and valving is simplified.

Of course if the manipulator arm is to be used by itself, which is perfectly possible, and is in an environment such as air, the double-acting cylinders will have to receive fluid at both ends. The preferred simplification and elimination of control valves and piping, which is made possible by having one end of the cylinder open to the ambient water, is of course not achieved unless the arm is to be used under water, which is of course its most important field and where it will normally be used in combination with the submersible itself.

Construction materials of the submersible and of the moving elements of the arm must, of course, be suitable for use in the environment in which the vessel and manipulator arm are used. This dictates the use of relatively non-corroding materials, expecially for use in salt water, such as nylon hydraulic tubing, fluorocarbon bearings and seals and epoxy and acrylic protective coatings.

The design of underwater television camera and lights are not changed by the present invention, and normal good design is used. The fact that it is not necessary to design a new type of television camera or of lights simplifies the construction of the submersibles according to the present invention and so it is a practical advantage.

While any means for maintaining the trim of the submersible with a small positive buoyancy may be employed, it is preferred in the present invention to use a plurality of chambers, such as one chamber forward and one chamber aft, partially filled with water and with air. The relative amounts of water and air are adjusted before the submersible is lowered into the water and then trimming is affected by pumping more or less water into the chamber. If it is desired to decrease the buoyancy, water is pumped in, which therefore increases the net weight of the chambers; and conversely, if it is desired to increase the positive buoyancy, water is pumped out until the expanding somewhat compressed air occupies a larger portion of the chamber. As the submersible sometimes is tilted considerably, it is desirable to prevent mixing of the air and water, and this can easily be done by a simple free piston or flexible diaphragm which moves up and down but which does not permit the liquid and gas to mix.

Pumping is facilitated by precharging the pressure in each buoyancy chamber prior to the start of operations, so that at the desired operating depth, the pressure differential relative to the ambient pressure present is minimized.

*Brief description of the drawings*

FIG. 1 is a diagrammatic illustration of a submersible, mother ship, and extended manipulator arm. It is not to scale;

FIG. 2 is a diagrammatic illustration of two submersibles with manipulator arm in storage position and connections to two television and control consoles;

FIG. 4 is a phantom view of propulsion and level control jets;

FIG. 5 is an elevation, partly broken away in section, of a pair of buoyancy adjusting chambers and an adjustable drag chain;

FIG. 8A is an isometric of the manipulator arm pivoted downward;

FIG. 8B illustrates the shoulder joint of the same arm in a level position;

FIG. 8C illustrates the linkage used to swing the arm horizontally from the storage position and provide horizontal movement when the arm is in use;

FIG. 9 is an isometric of a manipulator arm in a lowered and almost completely extended position;

FIG. 10 is an enlarged elevation of a hand element with finger in the open position;

FIG. 11 is a detail, partially in section, of the finger turning and grasping mechanism of FIG. 10;

*Description of the preferred embodiments*

Figure 3:
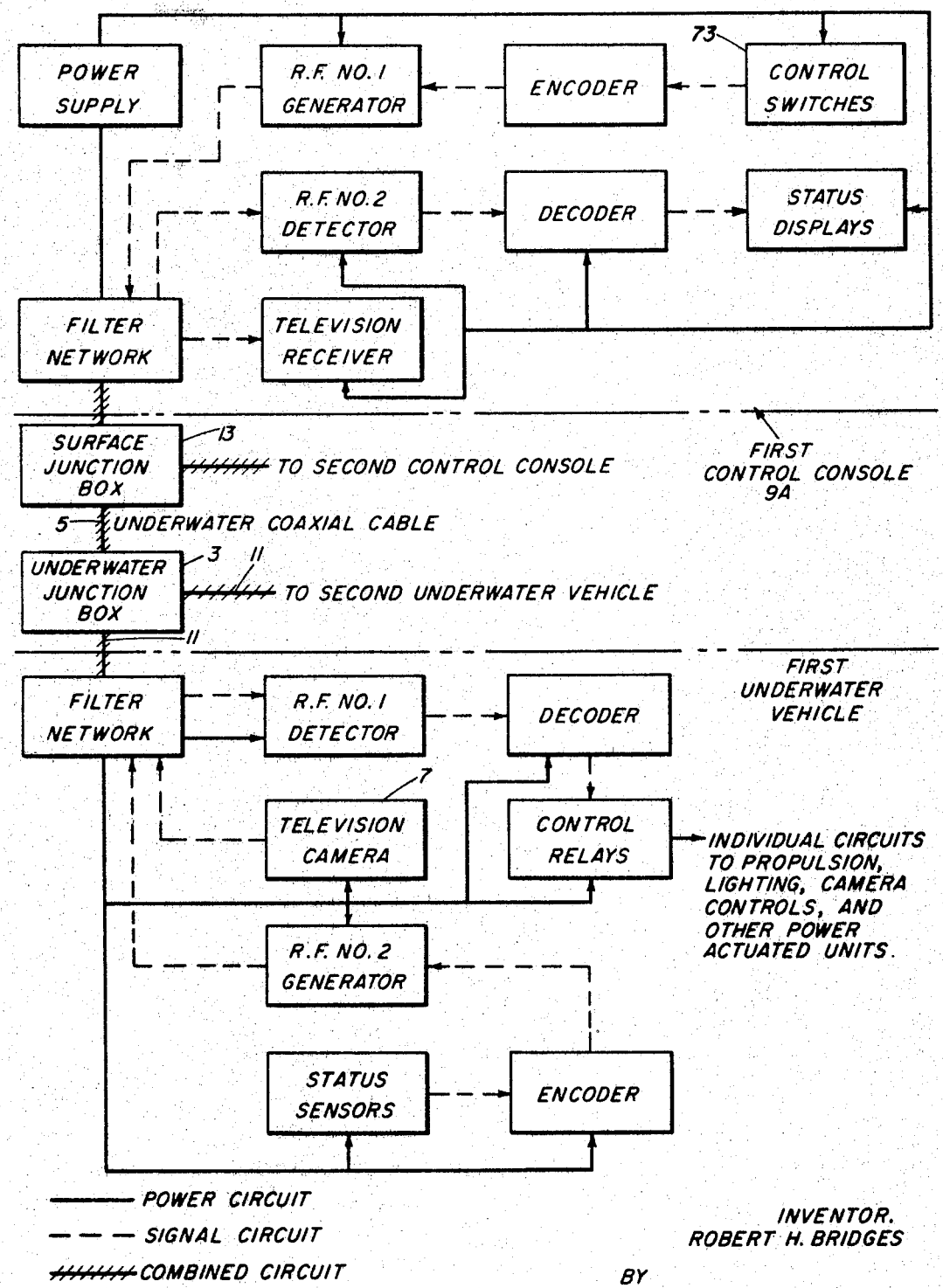
FIG. 3 is a block diagram of a typical arrangement of power and signal circuits for two submersibles.

FIG. 1 shows a diagrammatic representation of a mother ship 2 with a submersible 1. The drawing is not to scale, the submersible being on a greatly enlarged scale as compared to the ship. A power cable 5 extends down from the ship to an underwater junction box 3, which is anchored by an anchor 4 and from which a horizontal cable 11 extends to the submersible, entering it at its stern. The horizontal extent reduces fouling possibilities, for example with the stern jets 16, and of course the horizontal cables do not extend above the top of the submersible and therefore do not tend to foul the level control jets 14 or the manipulator arm 6. This will be more apparent in the enlarged view in FIG. 2 where the power cable 5 is shown as extending up to a junction box 13 on the ship from which signal cables 12A and 12B go to television consoles 9A and 9B. These consoles are also provided with a series of control switches which are shown as small dark circles 73.

It will be noted that in FIG. 1 the manipulator arm 6 is extended to its fullest extent and is shown diagrammatically as grasping loose objects to be lifted up. The submersibles also are provided with conventional underwater television cameras, the viewing ports 7 of which appear in FIG. 2. The underwater lights are at 8, so that the end of the manipulator arm is well illuminated and can be seen on the viewing screens of the consoles 9A and 9B in FIG. 2.

In addition to the vertical trim jets 14 and the forward propulsion jets 16, there are jets 15 at the bow of the submersible which can act as brakes or move the submersible backward. They extend out from the side of the submersible but not in front of it, so that they do not interfere with the motion of the manipulator arm.

FIG. 4 shows a phantom view of the connections to the jets. A pump 28 receives ambient water through the intake 19 in the bottom of the submersible and pumps it to a main supply pipe 75. The ends of the pipe branch at 76 and lead to the propulsion jets 15 and 16, through suitable solenoid control valves 17, and to the vertical level jets 14 through solenoid valves 18. The electrical actuation of the motor and of the valves is of purely conventional design and is not shown in the drawing in order to avoid confusion. In operation, of course, if the two valves 17 controlling the jets 16 are opened, the submersible will move forward. Conversely, if the valves 17 controlling the jets 15 are opened, the submersible will move backward. Turning in a horizontal plane is easily effected by operating individual jets 15 or 16 on only one side of the submersible, or by operating in dual combination jets 15 and 16 on opposite sides of the submersible. When the submersible has slight positive buoyancy, as has been described above, flow through the jets 14 which is controlled by valves 18 can offset this positive buoyancy. This permits control of the depth of the submersible. If the valves 18 are not equally opened so that more water flows out through one jet 14 than the other, the submersible is tilted, which is sometimes of advantage as if it encounters or sees a relatively high obstacle, tilting the bow up and driving with the jets 16 can cause more rapid rise than by adjustment of trim.

The offsetting of the positive buoyancy is of importance when the submersible is being maneuvered. However, when a submersible has been moved to a desired position, and particularly when it is desired to use the manipulator arm, at this point it is usually preferable to have the submersible sit on the bottom and so present a more stable platform for the manipulator. This is easily effected by increasing the flow through the jets 14 or by varying the buoyancy by means of the buoyancy tanks to produce a definite negative buoyancy. Obviously, of course a combination of the two means may be used.

Buoyancy adjustment mechanism is shown in FIG. 5. There are two chambers 30 and 31 fore and aft with an air portion 33 and a water portion 34 shown in the left hand container, which is sectioned, and of course are repeated in the right hand container 31. The free piston 32 prevents mixing of compressed air and water on sudden or excessive tilting. Before the submersible is lowered, the desired amount of compressed air is introduced from a source (not shown), through valves 28 and 29. These valves are then closed tight. In the submersible there is a reversible pump 25 receiving ambient water through the pipe 26. This pump pumps water into the water spaces 34 of the two chambers through solenoid valves 35 and 36. If it is desired to reduce the buoyancy of the submersible, more water is pumped into the parts 34 of the chambers, compressing the air and increasing the weight of the chambers and therefore, of course, the weight of the whole submersible. On the other hand, if it is desired to increase the positive buoyancy, water is pumped out, the air at 33 expands, and the weight of the chambers becomes less.

FIG. 5 also shows a mechanism for rapid adjustment of the level of the vessel above sea bottom as it moves along without having to observe every instant through the television system. A double-acting cylinder 24 with control valves 27 and 37 (A and B), moves a piston rod 23 through the hull of the submersible at 21. On the end of the rod there is a chain 22, only two links of which are shown in FIG. 5. Actually this chain is sufficiently long so when the rod is extended to the desired amount, a number of links of chain remain on the bottom with the proper adjustment of the buoyancy control chambers 30, 31. If an obstacle is encountered, or rather if the level of the bottom changes, more or less chain links are supported by the bottom, and this changes the buoyancy of the submersible and corrects the distance from the bottom to maintain a desired constant distance. To change this desired constant distance, the extension of piston rod 23 is increased or decreased.

FIG. 3 is a block diagram of a typical arrangement for power supply and signals. The console 9A of one submersible is shown at the top of the drawing interconnected by a control cable running from the surface junction box 13. A similar cable connects to the second control console 9B. The console itself is not shown. The underwater cable 5 extends down to the underwater junction box 3 through which a cable 11 runs to one of the submersibles, and a second cable 11 to the second submersible, which is also not shown. It will be seen that the cable carries the television signals on an appropriate RF carriers and power, which may be DC or very low frequency AC, and also control and status signals on RF carriers at frequencies quite different from those of the video RF carriers. RF #1 carrier is modulated by control signals reflecting the status of the control switches 73 and after passing through a suitable filter network and a corresponding filter network in the submersible, leads to the appropriate RF detector, control signal decoder and to the various control relays. The submersible has various status sensors for the different positions of the elements of the manipulator arm and other mechanisms and the submersible orientation and these are encoded on their own carrier frequency, supplied by RF generator #2 up to the console where the signals are detected, decoded, and conventional status displays produced. All of these electronic and electrical circuits are of conventional design, and the particular details therefore form no part of the present invention. It is also possible, of course, to have the elements combined in somewhat different forms than shown in FIG. 3, which is merely a typical illustrative block diagram.

Figure 7:
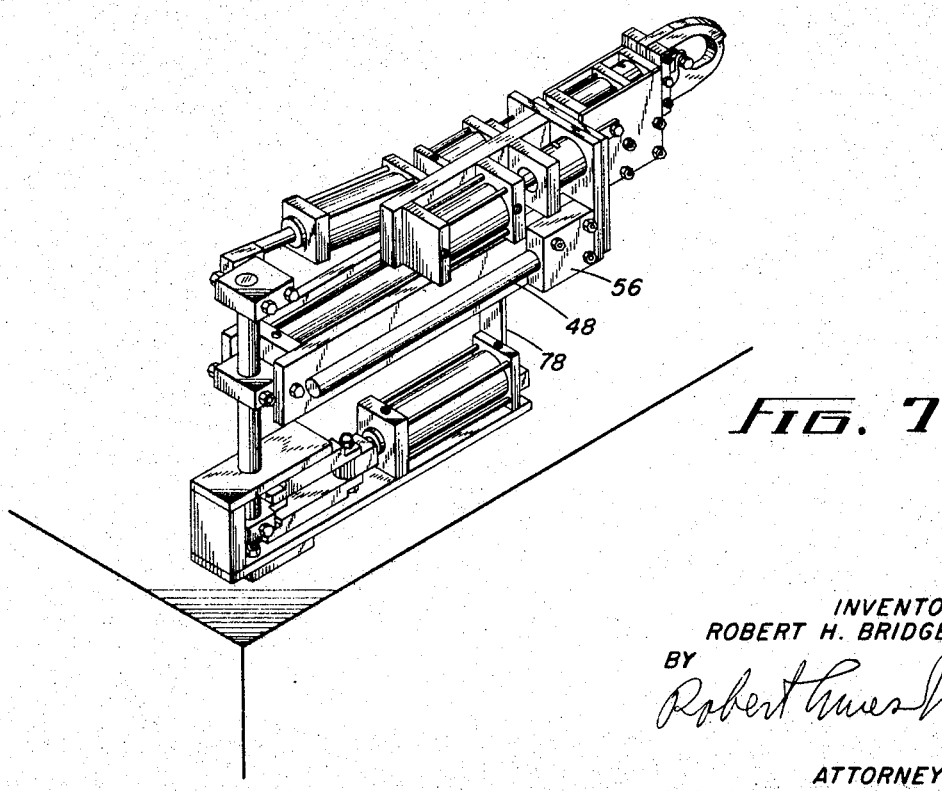
FIG. 7 is an isometric of a manipulator arm in retracted storage position.

FIG. 7 shows a manipulator arm in retracted position turned to the rear of the submersible for towing or storage purposes. It will be seen that it is supported firmly on the support 78. As hydraulic cylinders are used, the arm is locked in place when the related control valves are in their normally closed status. This can also be seen in FIG. 8A. It will also be seen that the manipulator arm does not project greatly above the top of the submersible, and in its retracted and towing position represents a minimum problem in cable fouling.

The manipulator arm is provided with a shoulder joint, which can be seen in the partially lowered position in FIG. 8A and in a raised or level position in FIG. 8B. Movement of the manipulator arm horizontally is effected by the pivoted, double-acting cylinder 40, with an actuating rod 41 and a crank 10 which turns the shaft 38. As shown in FIG. 8C, the actuating rod is pivotally connected to two links 39 and 89. The pivot is through a block 90 at the end of the rod. Link 89 is pivotally connected to base 45 and link 39 in turn is pivotally connected to the crank 10. The shaft 38 is also journalled in top and bottom plates of the base 45. The shaft 38 is provided with enlargements which serve as bearing shoulders for the crank 10 and maintain it in predetermined vertical alignment. The links 39 and 89 make it possible for the crank 10 to be moved through an arc greater than 180°. Without the links when the rod 41 and the crank 10 were moved to a parallel position this would constitute a dead center and would preclude further rotation. The links 39 and 89 however, permit further movement of the crank 10 beyond what would otherwise be a dead center position. The travel of the rod 41 in the retracted position is limited to a point just before the crank 10 and links 39 and 89 would lie in the same plane. The manipulator base 45 on which one end of the cylinder 40 is pivoted, carries a stop 77 and is rigidly assembled to the main structure of the submersible. In order to further minimize the possibility of fouling, most of the manipulator arm is shrouded. However, in order to display the mechanism clearly the shrouding is not shown. Also, in order not to confuse the drawings, the flexible hydraulic tubing connections to the ends of the cylinders are not shown, the openings only appearing. The connections will be described in greater detail below in connection with the preferred method of operating.

The shaft 38 carries two blocks or plates 43 and 42. In the latter there are pivoted guide rails 49, and the upper block 43 has pivoted to it the end of a piston rod 98 which goes to the cylinder 46, which serves to move the manipulator arm up or down.

The cap end 50 of cylinder 46 is pivotally connected to bracket 47 which in turn is rigidly connected to one of the two guide rails 49. Increasing the length of piston rod 98 outside of cylinder 46 lowers the arm while decreasing the length of piston rod 98 outside of cylinder 46 raises the arm. It should be noted that alternatively cylinder 46 and its pivot points could be located below the guide rails 49. Also for increased lifting force cylinder 46 and its pivot points could be duplicated on the second guide rail 49.

As can best be seen in FIG. 9 the arm can be extended by the cylinder 52 located between guide rails 49, which moves a plate 57 constituting the end of the forearm straight in or out. The end plate 91 of the cylinder is rigidly assembled to the guide rails 49, and it will be seen that the piston operates on a rod 55. The plate 57 moves two guide rods 48 which pass through guide blocks 56 which are rigidly assembled to guide rails 49 and permit the arm to be lengthened or shortened while maintained rigid in a strong structure. A clearance hole is provided in bracket 47 so that shaft 48 may freely pass through. FIG. 8A shows the arm shortened all the way, while FIG. 9 shows the arm in an almost fully extended position.

Figure 12:
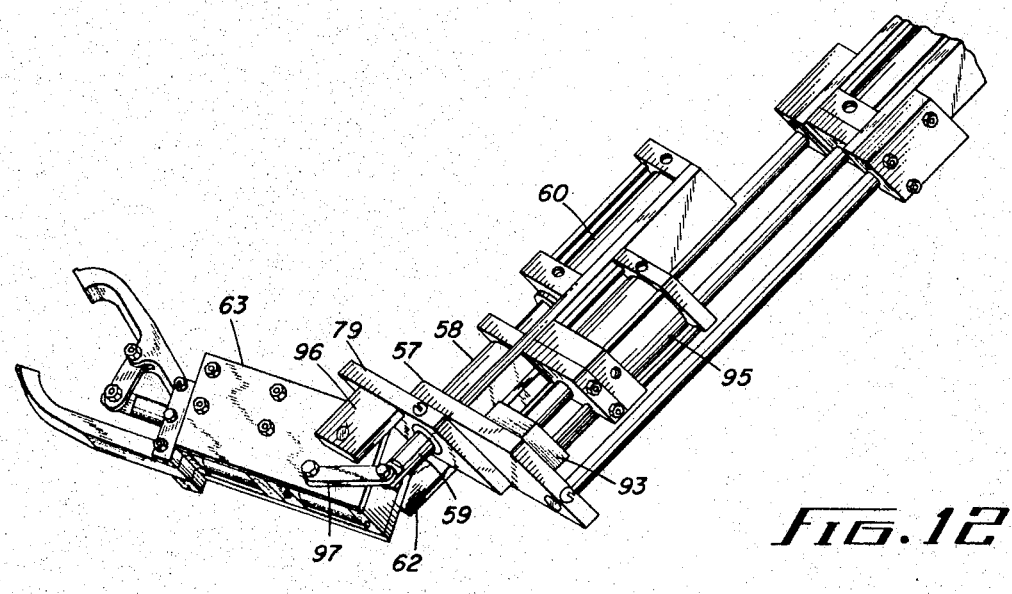
FIG. 12 shows one end of a manipulator arm with the hand twisted in the horizontal position and the fingers open.

In FIG. 8A rotation of the plate 79 is effected by a barrel cam 58 with a spiral slot 61 which engages with a pin in a plate 93. Actuation is by the cylinder 95 which moves the plate 93 on guide rails 94. As depicted in FIG. 12 the plate 79 carries support 62 and 96 in which the hand element 63 is pivoted. The hand element can be turned about its pivot by the shaft 59 which is actuated by a cylinder 60.

The two functions, the pivoting of the hand element 63 in brackets 62 and 96, and the rotation of the plate 79, to which these brackets are assembled, permits the hand element to be orientated in two planes at 90° to each other. These two functions can be separately controlled. In both FIGS. 12 and 13 the advance of piston rod 59 by cylinder 60 has pivoted hand element 63 through link 97. While the axis of piston rod 59 is concentric with the axis of barrel cam 58, it is free to move back and forth along this axis as cylinder 60 is actuated. In FIG. 12, plate 79 and the related hand element has been rotated in comparison to the position indicated in FIG. 13. As plate 79 is rigidly assembled to a projecting hub of barrel cam 58, it rotates with the movement of plate 93 as actuated by cylinder 95 as a pin in plate 93 rides in the cam groove of barrel cam 58. Although the rotation of plate 79 actually results in the rotation of piston rod 59, because of the link 97 being assembled to hand element 63, this rotation does not affect the degree to which the hand element 63 is pivoted in supports 62 and 96 as the projection of piston rod 59 is uneffected. Piston rod 59 is free to rotate even though its cylinder 60 is fixed because all related surfaces, including the piston circumference, are concentric and capable of both reciprocating and rotational movement.

Figure 13:
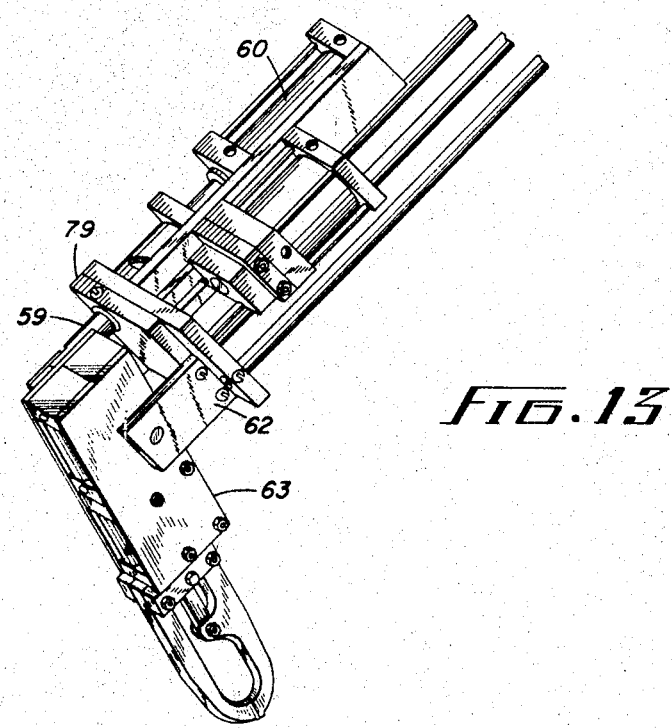
FIG. 13 is a similar isometric view with the hand bent down and the fingers closed.

The mechanism of the hand and fingers is best seen in FIGS. 10 and 11. Turning to FIG. 10, there is a barrel cam 64 with a slot 80 in which a pin 65 engages. This pin is moved by the piston shaft 72 of a cylinder 71 and causes the hand plate 69 to twist. Hand plate 69 is rigidly assembled to a projecting hub of barrel cam 64. FIGS. 12 and 13 and also FIGS. 8A and 9 show the untwisted position so that the pivoted finger is at the bottom of hand element 63. Additional views, FIGS. 10 and 11, show the pin 65 and slot 80 in a position where the pivoted finger 69 has been turned nearly 180°.

Actuation of the pivoted finger is by another cylinder 66 which moves a shaft 67 passing through the center of the barrel cam 64, and this causes the movable finger 68 to pivot on the finger plate 69 and move away from the fixed finger 70 or close to it. The motion is through the link 81. FIGS. 8A, 9, and 13 show the fingers closed, as does FIG. 7, which shows the retracted arm in towing position; whereas FIG. 10 and FIG. 12 show the fingers open.

While a simple barrel cam is used here to illustrate the two applications of this mechanism, other designs are possible which make use of this principle. As examples, in order to balance thrust forces, a pair of pistons on opposite sides of the barrel cam may be used, or the cam track may be varied.

Figure 6:
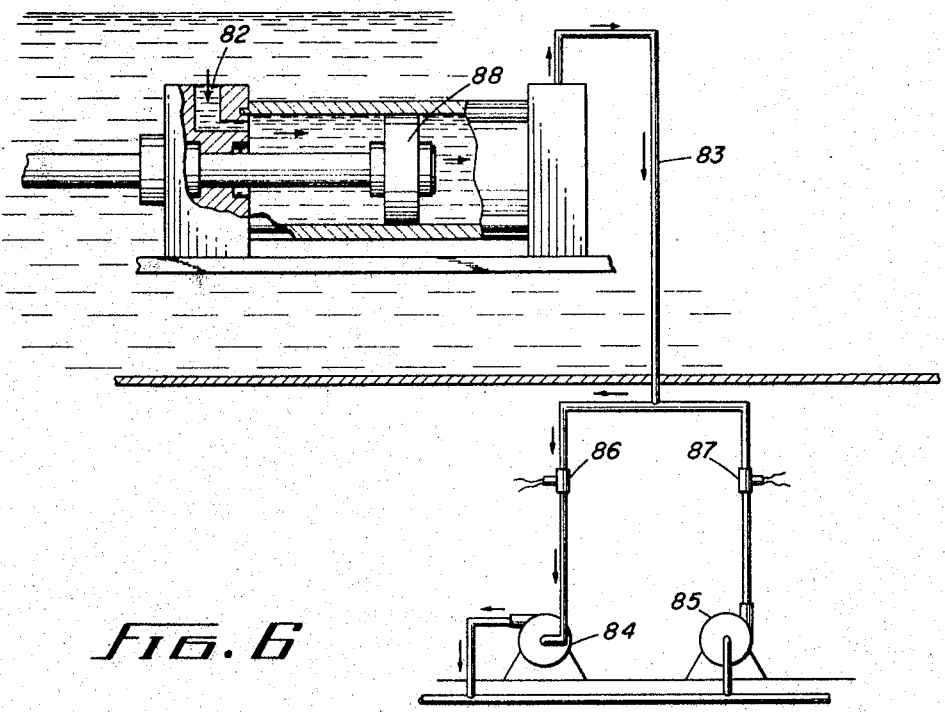
FIG. 6 is an elevation, partly broken away, on a larger scale, of a double-acting actuating cylinder using ambient water for actuation.

The double-acting cylinders for actuating the various movements of the manipulator ar mcan be of any suitable design. However, for submerged use it is desirable to have one end of the cylinder open to the ambient water through the port 82, shown in FIG. 6, whereas a piping 83 connects pumps 84 and 85 to the other end of the cylinder through control valves 86 and 87. FIG. 6 shows water being pumped out of one end of the cylinder, as is indicated by the arrows, and this causes a lowered fluid pressure in this portion of the cylinder and therefore the ambient water moving in through the port 82 moves the piston 88 in the direction shown in FIG. 6. The contrary movement is effected by pumping water into the end of the cylinder, which creates a higher pressure than that of the ambient water and causes the piston 88 to move in the opposite direction. Similar connections are made to all of the actuating cylinders in the manipulator arm, but it is not necessary that there be a pair of pumps for each cylinder. Two pumps, one creating pressure greater than the ambient and the other less, can connect through suitable piping and control valves to each of the cylinders. For simplicity, this piping is not shown in the drawings and FIG. 6 simply shows the connections to one typical cylinder. Obviously, of course, a single reversible pump or a single pump with suitable valving connecting either the intake or exhaust side may replace the two separate pumps shown.

The use of ambient water as the hydraulic fluid for the pumps and the cap end of the cylinders greatly simplifies piping and eliminates the need for a reservoir. Sealing also becomes less critical. It is possible to use other hydraulic fluids such as oils but the use of ambient water has such definite advantages that it constitutes the preferred embodiment of the invention.

While the combination of hollow barrel cams and shafts passing though them for rotation and/or pivoting of manipulator elements is the most important single use for this type of mechanism, the mechanism is itself new and can be used for other purposes such as for example rotating a camera and inclining it up and down. In another aspect of the invention such a mechanism is included without limiting it to combination with a manipulator arm.

I claim:
1. A manipulator arm comprising in combination,
   (a) a shoulder joint providing arm movements about two orthogonal axes, actuating fluid cylinders therefor,
   (b) guide members, fluid actuating means for lengthening or shortening the arm along a guided path formed by the guide members,
   (c) a terminal device assembly and hydraulically actuating cylinder means for orientating said terminal device assembly about two orthogonal axes, one of said axes being at 90° to the longitudinal axis of the arm, (d) task performing elements attached to the terminal device assembly, (e) means for actuating said elements and for rotating them relative to the terminal device assembly, (f) at least the means for rotating manipulator arm components, other than task performing elements individually, comprise a barrel cam having a spiral cam contour and a cooperating cam follower and hydraulically actuated means for effecting relative movement between the cam follower and the cam contour whereby rotational motion is effected.

2. A manipulator arm according to claim 1 in which the task performing elements are grasping elements, the terminal assembly device thus being capable of a simulation of the human hand, a barrel cam for rotating the grasping elements said cam being hollow and actuating means for the grasping elements comprising a rod passing thru the hollow cam.

3. A manipulator arm according to claim 2 in which the barrel cam is provided with a cam contour in the form of a spiral slot and the cam follower is "a pin."

4. A manipulator arm according to claim 1 in which the cam contour is a spiral slot and the cam follower is a pin.

5. Means for producing rotation of an element and pivoting thereof about an axis at right angles to the axis of rotation which comprises, attached to the element, a hollow, barrel cam having a spiral cam contour and cooperating cam follower, piston actuated means for producing relative motion between cam follower and spiral cam contour whereby the element is rotated, piston actuated means passing through the hollow cam and attached to the element eccentrically with respect to its pivot, whereby rotation and pivoting of the element is effected.

6. Means according to claim 5 in which the cam contour is a spiral slot and the cam follower is in the form of a pin cooperating with said slot.

7. A manipulator arm according to claim 1 in which the shoulder joint is provided through the crank and a shaft constituting one of the two orthogonal axes and a piston actuated rod connected to the crank through linkages which permit rotation of the shaft through more than 180° without the rod and crank passing through a position of dead center.

8. A manipulator arm according to claim 2 in which the shoulder joint motion is provided through the crank and a shaft constituting one of the two orthogonal axes and a piston actuated rod connected to the crank through linkages which permit rotation of the shaft through more than 180° without the rod and crank passing through a position of dead center.

References Cited

UNITED STATES PATENTS

| | | | |
|---|---|---|---|
| 3,160,290 | 12/1964 | Wilson | 214—1 |
| 3,171,549 | 3/1965 | Orloff | 214—1 |

GERALD M. FORLENZA, *Primary Examiner.*

G. F. ABRAHAM, *Assistant Examiner.*

U.S. Cl. X.R.

74—57; 214—147